United States Patent
Iwamura et al.

(10) Patent No.: US 12,081,799 B2
(45) Date of Patent: Sep. 3, 2024

(54) ENCODING DEVICE, DECODING DEVICE AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 92 days.

(21) Appl. No.: 17/849,233

(22) Filed: Jun. 24, 2022

(65) Prior Publication Data

US 2022/0329863 A1 Oct. 13, 2022

Related U.S. Application Data

(63) Continuation of application No. PCT/JP2020/048304, filed on Dec. 23, 2020.

(30) Foreign Application Priority Data

Dec. 26, 2019 (JP) ................................ 2019-235621

(51) Int. Cl.
*H04N 19/61* (2014.01)
(52) U.S. Cl.
CPC .................................... *H04N 19/61* (2014.11)
(58) Field of Classification Search
CPC .... H04N 19/61; H04N 19/186; H04N 19/176; H04N 19/46; H04N 19/12
See application file for complete search history.

(56) References Cited

U.S. PATENT DOCUMENTS

| 2013/0034154 A1* | 2/2013 | Song | H04N 19/109 |
| | | | 375/240.03 |
| 2019/0215516 A1* | 7/2019 | Lim | H04N 19/122 |
| (Continued) | | | |

FOREIGN PATENT DOCUMENTS

| EP | 3389274 A1 | 10/2018 |
| WO | 2018/123644 A1 | 7/2018 |

OTHER PUBLICATIONS

International Search Report issued in PCT/JP2020/048304; mailed Mar. 16, 2021.

(Continued)

*Primary Examiner* — Kathleen V Nguyen
(74) *Attorney, Agent, or Firm* — Studebaker & Brackett PC

(57) ABSTRACT

An encoding device performing an encoding process in units of blocks into which images constituted by luminance signals and chrominance signals are divided includes: a predictor configured to predict a target chrominance block which is an encoding target block of the chrominance signals and generate a prediction chrominance block; a residual generator configured to generate a chrominance prediction residual indicating a difference between the target chrominance block and the prediction chrominance block; and a transformer configured to apply a transform process to the chrominance prediction residual and generate transform coefficients, wherein the transformer is configured to control, according to a signal format of the images, a transform type to be applied to the transform process.

10 Claims, 6 Drawing Sheets

(56) References Cited

U.S. PATENT DOCUMENTS

2020/0112734 A1\* 4/2020 Zhao ................... H04N 19/186
2021/0243475 A1 8/2021 Tsukuba

OTHER PUBLICATIONS

Benjamin Bross et al.; "Versatile Video Coding (Draft 7)"; Joint Video Experts Team (JVET) of ITU-T SG 16 WP 3 and ISO/IEC JTC 1/SC 29/WG 11, 16th Meeting; JVET-P2001-v7; Oct. 1-11, 2019; pp. 1-489; Geneva, Switzerland.
Li, Ling et al.; "Non-CE6: Maximum TU size for chroma format 4:2:2 and 4:4:4"; Joint Video Experts Team (JVET) of ITU-T SG 16 WP 3 and ISO/IEC JTC 1/SC 29/WG 11, 15th Meeting; JVET-O0357-v3; Jul. 3-12, 2019; pp. 1-5; Gothenburg, Sweden.
Tsukuba, Takeshi et al.; "On Adaptive Multiple Core Transform for Chroma"; Joint Video Experts Team (JVET) of ITU-T SG 16 WP 3 and ISO/IEC JTC 1/SC 29/WG 11, 5th Meeting; JVET-E0036; Jan. 12-20, 2017; pp. 1-5; Geneva, Switzerland.
Tsukuba, Takeshi et al.; "CE6: Chroma AMT (CE6.1.7.1)"; Joint Video Experts Team (JVET) of ITU-T SG 16 WP 3 and SO/IEC JTC 1/SC 29/WG 11, 11th Meeting; JVET-K00121-v1; Jul. 10-18, 2018; pp. 1-10; Ljubljana, Slovenia.

\* cited by examiner

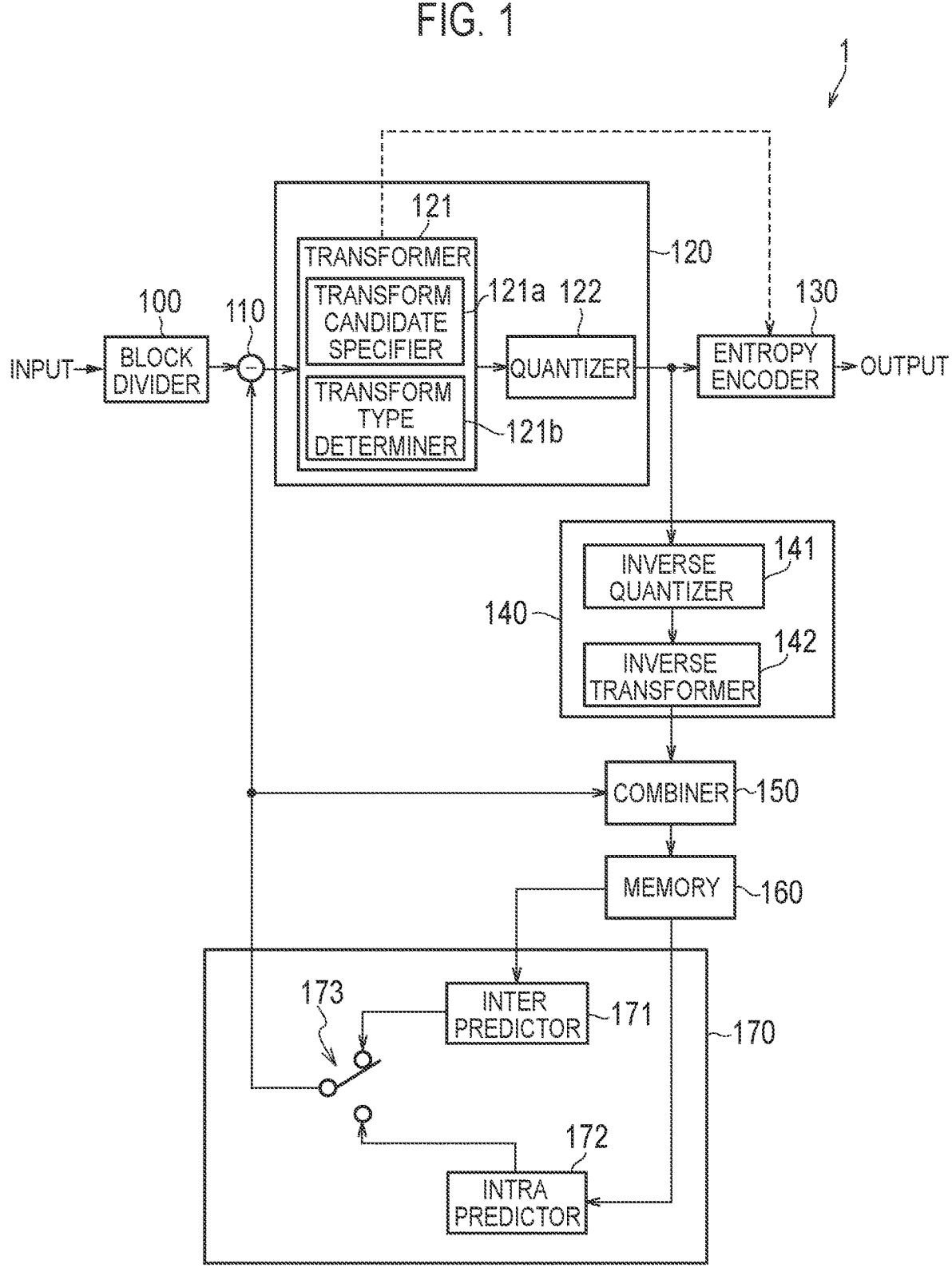

FIG. 2

| TRANSFORM TYPE | Basis function Ti(j), i, j = 0, 1, ..., N-1 |
|---|---|
| DCT2 | $Ti(j) = \omega_0 \cdot \sqrt{\dfrac{2}{N}} \cdot \cos\left(\dfrac{\pi \cdot i \cdot (2j+1)}{2N}\right)$ <br> where, $\omega_0 = \begin{cases} \sqrt{\dfrac{2}{N}} & i = 0 \\ 1 & i \neq 0 \end{cases}$ |
| DCT8 | $Ti(j) = \sqrt{\dfrac{4}{2N+1}} \cdot \cos\left(\dfrac{\pi \cdot (2i+1) \cdot (2j+1)}{4N+2}\right)$ |
| DST7 | $Ti(j) = \sqrt{\dfrac{4}{2N+1}} \cdot \sin\left(\dfrac{\pi \cdot (2i+1) \cdot (j+1)}{2N+1}\right)$ |

FIG. 3

| SIGNAL FORMAT | HORIZONTAL TRANSFORM TYPE CANDIDATE | VERTICAL TRANSFORM TYPE CANDIDATE | FLAG INFORMATION |
|---|---|---|---|
| 4:2:0 | DCT2 | DCT2 | NOT REQUIRED |
| 4:2:2 | DCT2 | DCT2 | 0 |
| | DCT2 | DCT7 | 10 |
| | DCT2 | DCT8 | 11 |
| 4:4:4 | DCT2 | DCT2 | 0 |
| | DCT7 | DCT7 | 100 |
| | DCT7 | DCT8 | 101 |
| | DCT8 | DCT7 | 110 |
| | DCT8 | DCT8 | 111 |

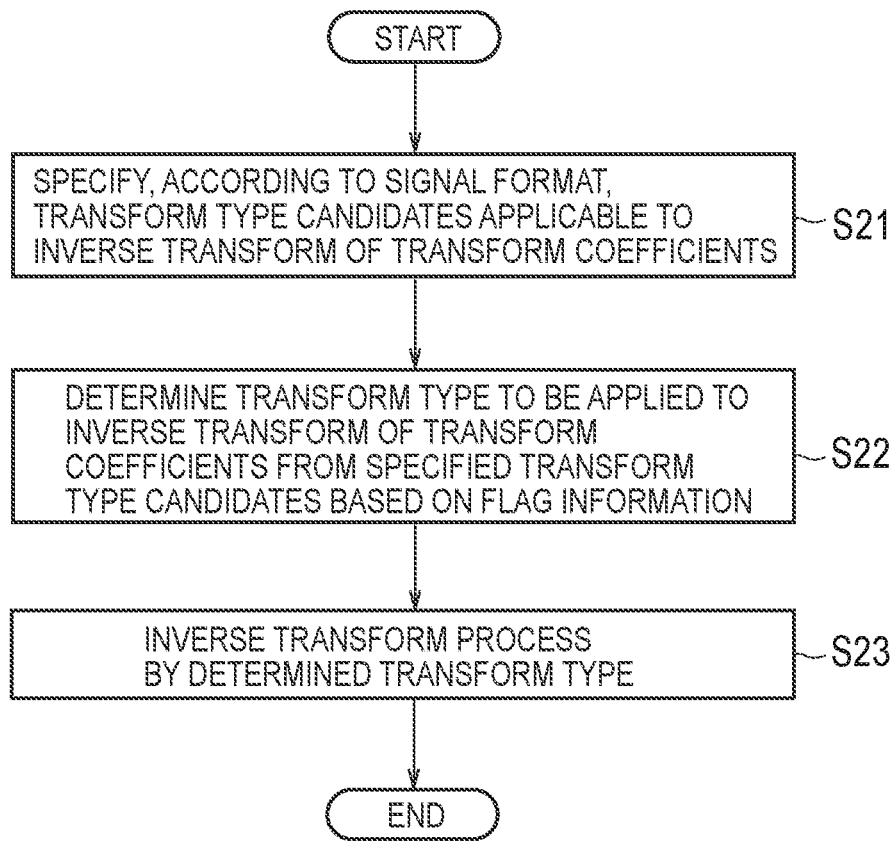

ENCODING DEVICE, DECODING DEVICE AND PROGRAM

RELATED APPLICATIONS

The present application is a continuation based on PCT Application No. PCT/JP2020/048304, filed on Dec. 23, 2020, which claims the benefit of Japanese Patent Application No. 2019-235621 filed on Dec. 26, 2019. The content of which is incorporated by reference herein in their entirety.

TECHNICAL FIELD

The present invention relates to an encoding device, a decoding device, and a program.

BACKGROUND ART

In a video encoding scheme represented by HEVC (High Efficiency Video Coding) and VVC (Versatile Video Coding), an encoding device generates a prediction residual which is a difference (error) between a prediction block that is a prediction image in units of blocks and an encoding target block while switching intra prediction and inter prediction in units of encoding target blocks into which source images are divided in units of blocks. The encoding device performs an efficient encoding process by applying a transform process to the generated prediction residual and concentrating energy distribution of the spatially spread prediction residual.

In the VVC, in order to increase a concentration degree of the energy distribution of the prediction residual, a plurality of transform types are selectively applicable to the prediction residual. Specifically, when selecting a default transform type for the prediction residual, the encoding device applies a DCT (Discrete Cosine Transform) type 2 (DCT2, hereinafter) for a horizontal direction and a vertical direction, and signals flag information indicating that the transform type is a default mode.

On the other hand, when selecting a mode which is not the default mode, the encoding device applies either one of a DCT type 8 (DCT8, hereinafter) and a DST (Discrete Sine Transform) type 7 (DST7, hereinafter) to the prediction residual respectively for the horizontal direction and the vertical direction and then signals flag information indicating which of the total of 4 types of modes that are combinations of DCT8 and DST7 is selected together with flag information indicating that the transform type is not the default mode.

However, in the VVC, the modes other than the default mode are applicable only to luminance signals and it is considered to apply only the default mode to chrominance signals. This is because, in a video signal format 4:2:0, a resolution of the chrominance signals is vertically and horizontally half the size of the resolution of the luminance signals and not many high frequency components are included in the chrominance signals.

CITATION LIST

Non Patent Literature

Non Patent Literature 1: JVET-P2001 "Versatile Video Coding (Draft 7)"

DISCLOSURE OF INVENTION

An encoding device according to a first feature performs an encoding process in units of blocks into which images constituted by luminance signals and chrominance signals are divided. The encoding device includes: a predictor configured to predict a target chrominance block which is an encoding target block of the chrominance signals and generate a prediction chrominance block; a residual generator configured to generate a chrominance prediction residual indicating a difference between the target chrominance block and the prediction chrominance block; and a transformer configured to apply a transform process to the chrominance prediction residual and generate transform coefficients, wherein the transformer is configured to control, according to a signal format of the images, a transform type to be applied to the transform process.

A decoding device according to a second feature performs a decoding process in units of blocks into which images constituted by luminance signals and chrominance signals are divided. The decoding device includes: a predictor configured to predict a target chrominance block which is a decoding target block of the chrominance signals and generate a prediction chrominance block; and an inverse transformer configured to apply an inverse transform process to transform coefficients from an encoding side and generate a chrominance prediction residual indicating a difference between the target chrominance block and the prediction chrominance block, wherein the inverse transformer is configured to control, according to a signal format of the images, a transform type to be applied to the inverse transform process.

A program according to a third feature causes a computer to function as the encoding device according to the first feature.

A program according to a fourth feature causes a computer to function as the decoding device according to the second feature.

BRIEF DESCRIPTION OF DRAWINGS

FIG. 1 is a diagram illustrating the configuration of an encoding device according to an embodiment.

FIG. 2 is a diagram illustrating a total of three transform types (Basis functions) of DCT2, DCT8 and DST7 relating to the embodiment.

FIG. 3 is a diagram illustrating a transform process to chrominance signals relating to the embodiment.

FIG. 6 is a diagram illustrating an operation flow relating to an inverse transform process in the decoding device relating to the embodiment.

DESCRIPTION OF EMBODIMENTS

Figure 4:
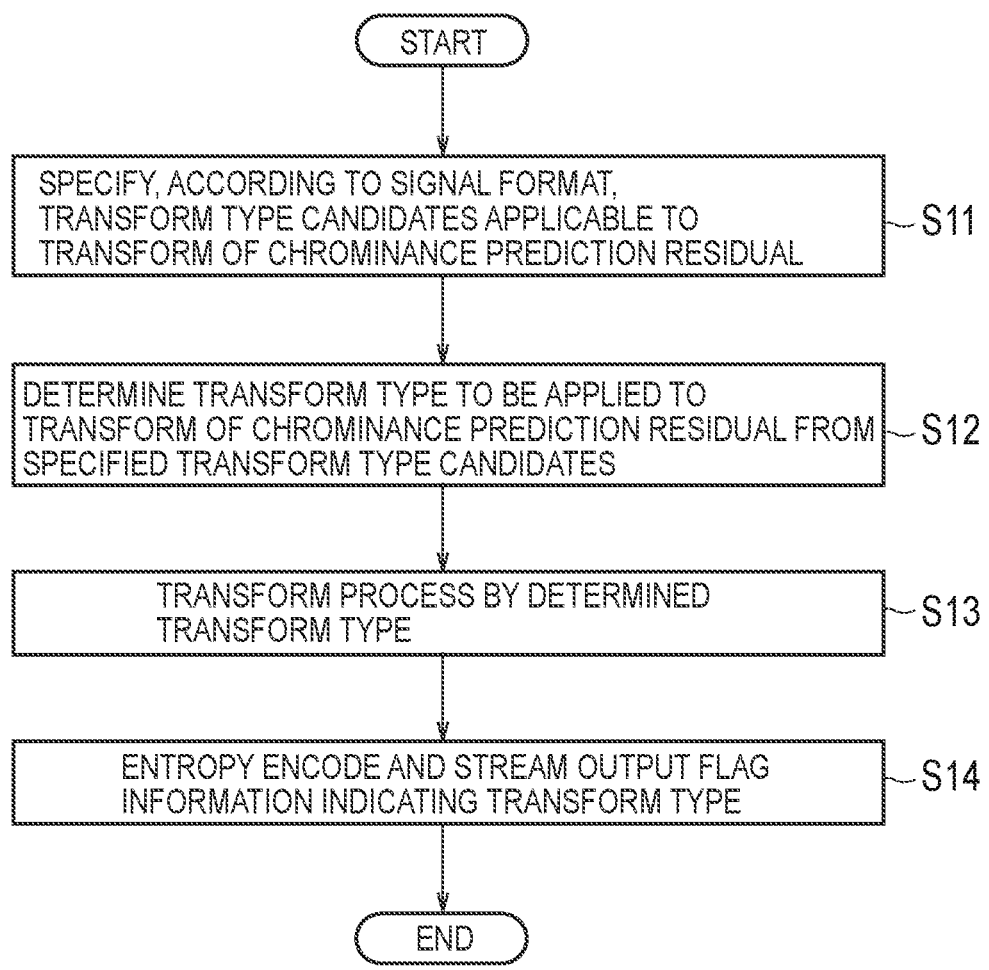
FIG. 4 is a diagram illustrating an operation flow regarding the transform process in an encoding device relating to the embodiment.

In a signal format 4:4:4, a resolution of chrominance signals is the same size as that of luminance signals, and an information amount included in the chrominance signals becomes substantially large compared to 4:2:0. Also in 4:2:2, since the resolution in a vertical direction is equal for the chrominance signals and the luminance signals, the information amount included in the chrominance signals becomes large similarly to 4:4:4 described above.

However, in a present VVC standards proposal, since only transform of a default mode is applicable to the chrominance signals regardless of a signal format, there is room for improving encoding efficiency of the chrominance signals.

Accordingly, in the present embodiment, an encoding device, a decoding device and a program that improve the encoding efficiency of the chrominance signals are provided.

An encoding device and a decoding device according to an embodiment are described with reference to the accompanying drawings. The encoding device and the decoding device according to the embodiment encode and decode videos such as MPEG videos. In the description of the drawings below, the same or similar reference signs are used for the same or similar parts.

<Encoding Device>

A configuration of an encoding device according to the present embodiment will be described first. FIG. 1 is a diagram illustrating a configuration of an encoding device 1 according to the present embodiment.

As illustrated in FIG. 1, the encoding device 1 includes a block divider 100, a residual generator 110, a transformer/quantizer 120, an entropy encoder 130, an inverse quantizer/inverse transformer 140, a combiner 150, a memory 160, and a predictor 170.

The block divider 100 divides an original image which is an input image in frame (or picture) units that constitutes a video into a plurality of image blocks and outputs the image blocks obtained by division to the residual generator 110. The size of the image blocks may be 32×32 pixels, 16×16 pixels, 8×8 pixels, or 4×4 pixels. The shape of the image blocks is not limited to square and may be rectangular (non-square). The image block is a unit (encoding target block) in which the encoding device 1 performs encoding process and is a unit (decoding target block) in which a decoding device performs decoding process. Such an image block is sometimes referred to as a CU (Coding Unit).

The block divider 100 outputs a luminance block and a chrominance block by performing block division on a luminance signal and a chrominance signal that constitute an image. The division may be controllable independently for the luminance signal and the chrominance signal. Hereinafter, the luminance block and the chrominance block are simply referred to as an encoding target block when the blocks are not particularly distinguished from each other.

The residual generator 110 calculates a prediction residual that represents a difference (error) between an encoding target block outputted from the block divider 100 and a prediction block obtained by the predictor 170 predicting the encoding target block. Specifically, the residual generator 110 calculates the prediction residual by subtracting each pixel value in the prediction block from each pixel value in the encoding target block, and outputs the calculated prediction residual to the transformer/quantizer 120.

The transformer/quantizer 120 executes a transform process and a quantization process on each of blocks. The transformer/quantizer 120 includes a transformer 121 and a quantizer 122.

The transformer 121 calculates transform coefficients by performing the transform process on the prediction residual outputted from the residual generator 110, and outputs the calculated transform coefficients to the quantizer 122. The transform process is a process of transforming the prediction residual from a spatial domain to a frequency domain, and includes, for example, discrete cosine transform (DCT), discrete sine transform (DST), Karhunen Loeve transform (KLT). The transform process may include a transform skip of performing adjustment by scaling or the like without transforming a pixel-domain signal to the frequency domain. The transformer 121 outputs information regarding the transform process applied to the encoding target block to the entropy encoder 130.

The transformer 121 can selectively apply a plurality of transform types to the prediction residual in order to improve a concentration degree of energy distribution of the prediction residual. In the present embodiment, there are three selectable transform types of DCT2, DCT8 and DST7. The selectable transform types may further include the transform type of a transform skip or the like.

Specifically, the transformer 121 has an MTS (Multiple Transform Selection) function of switching the plurality of transform types for each encoding target block. The transformer 121 determines the transform type from DCT2, DST7 and DCT8 for each of a horizontal direction and a vertical direction, and outputs transform type information indicating the determined transform type to the entropy encoder 130 and an inverse transformer 142.

FIG. 2 is a diagram illustrating the total of three transform types of DCT2, DCT8 and DST7 relating to the present embodiment. In FIG. 2, N denotes a size of the encoding target block. DCT8 includes a base that an impulse response monotonously decreases. Specifically, DCT8 is the transform that an impulse response $T_0(j)$ of a lowest-pass filter monotonously decreases (provided that j=0, ..., N−1). For DCT8, one end of a transform type waveform has a large value and is open. DST7 includes a base that the impulse response monotonously increases. Specifically, DST7 is the transform that the impulse response $T_0(j)$ of the lowest-pass filter monotonously increases (provided that j=0, ..., N−1). For DST7, one end of the transform type waveform is closed.

In the present embodiment, the three of DCT2, DCT8 and DST7 are described as examples of the plurality of types of the transform process to be applied to the prediction residual, however, the transform may be selectively switched and applied and is not limited to the three transform types. For example, other DCT/DST such as DCT1 and DCT5 may be used or the transform such as discrete wavelet transform may be used.

The quantizer 122 quantizes the transform coefficients outputted by the transformer 121 using a quantization parameter (Qp) and a quantization matrix, and outputs quantized transform coefficients to the entropy encoder 130 and the inverse quantizer/inverse transformer 140.

The entropy encoder 130 performs entropy encoding to the quantized transform coefficients outputted from the quantizer 122, generates encoded data (bit stream) by performing data compression and outputs the encoded data to an outside of the encoding device 1. For the entropy encoding, Huffman coding and/or CABAC (Context-based Adaptive Binary Arithmetic Coding) or the like can be used.

In addition, the entropy encoder 130 encodes the information regarding the transform process inputted from the transformer 121, outputs the bit stream and transmits (signals) it to the decoding side. Further, the entropy encoder 130 encodes information regarding a prediction process inputted from the predictor 170, outputs the bit stream and transmits it to the decoding side.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the quantized transform coefficients outputted from the quantizer 122 by using the quantization parameter (Qp) and the quantization matrix to restore the transform coefficients, and outputs the restored transform coefficients to the inverse transformer 142.

The inverse transformer 142 performs the inverse transform process corresponding to the transform process performed by the transformer 121 based on transform type information outputted from the transformer 121. For example, when the transformer 121 performs the discrete cosine transform, the inverse transformer 142 performs inverse discrete cosine transform. The inverse transformer 142 restores the prediction residual by performing the inverse transform process on the transform coefficients outputted from the inverse quantizer 141, and outputs a restoration prediction residual that is the restored prediction residual to the combiner 150.

The combiner 150 combines the restoration prediction residual outputted from the inverse transformer 142 with the prediction block outputted from the predictor 170 in pixel units. The combiner 150 decodes (reconstructs) the encoding target block by adding individual pixel values of the restoration prediction residual and individual pixel values of the prediction block, and outputs a decoded block to the memory 160. Note that the decoded block is sometimes referred to as a reconstructed block.

The memory 160 stores the decoded block outputted from the combiner 150 and accumulates the decoded block as decoded images in frame units. The memory 160 outputs the stored decoded block or decoded images to the predictor 170. Note that a loop filter may be provided between the combiner 150 and the memory 160.

The predictor 170 performs the prediction process in block units. The predictor 170 includes an inter predictor 171, an intra predictor 172 and a switcher 173.

The inter predictor 171 performs inter prediction utilizing an inter-frame correlation. Specifically, the inter predictor 171 calculates a motion vector through a method such as block matching by using the decoded image stored in the memory 160 as a reference image, generates an inter prediction block by predicting the encoding target block, and outputs the generated inter prediction block to the switcher 173. Here, the inter predictor 171 selects an optimal inter prediction method from inter prediction using a plurality of reference images (typically, bi-prediction) and/or inter prediction using one reference image (uni-directional prediction), and performs the inter prediction by using the selected inter prediction method. The inter predictor 171 outputs information regarding the inter prediction (the motion vector and the like) to the entropy encoder 130.

The intra predictor 172 performs intra prediction utilizing an intra-frame spatial correlation. Specifically, the intra predictor 172 generates an intra prediction block by referring to decoded pixels present around the encoding target block of the decoded image stored in the memory 160, and outputs the generated intra prediction block to the switcher 173. The intra predictor 172 selects an intra prediction mode to be applied to the encoding target block from among a plurality of intra prediction modes, and predicts the encoding target block by using the selected intra prediction mode.

The switcher 173 switches the inter prediction block outputted from the inter predictor 171 and the intra prediction block outputted from the intra predictor 172 and outputs one of the prediction blocks to the residual generator 110 and the combiner 150.

The encoding device 1 configured in this way encodes the luminance block as the encoding target block (referred to as a target luminance block, hereinafter) and the chrominance block as the encoding target block (referred to as a target chrominance block, hereinafter) respectively. In the description of the encoding device 1 below, the encoding process of the target chrominance block will be mainly described.

The encoding device 1 relating to the present embodiment performs the encoding process in units of blocks into which images constituted by the luminance signals and the chrominance signals are divided. The encoding device 1 includes the predictor 170 that predicts the target chrominance block which is the encoding target block of the chrominance signals and generates a prediction chrominance block, the residual generator 110 that generates a chrominance prediction residual representing a difference between the target chrominance block and the prediction chrominance block, and the transformer 121 that applies the transform process to the chrominance prediction residual and generates chrominance transform coefficients.

Next, the transformer 121 relating to the present embodiment will be described. In the present embodiment, the transformer 121 can apply the MTS of switching the transform type for each encoding target block not only to the luminance block but also to the chrominance block.

First, the transform process to the luminance signals will be described. In encoding of the luminance block, when selecting a default transform type for a luminance prediction residual, the transformer 121 applies DCT2 for the horizontal direction and the vertical direction, and signals flag information indicating that the transform type is a default mode by the entropy encoder 130. On the other hand, when selecting a mode which is not the default mode, the transformer 121 applies either one of DCT8 and DST7 to the luminance prediction residual respectively for the horizontal direction and the vertical direction, and then signals flag information indicating which of the total of 4 types of modes that are combinations of DCT8 and DST7 is selected together with flag information indicating that the transform type is not the default mode by the entropy encoder 130.

Secondly, the transform process to the chrominance signals will be described. The transformer 121 relating to the present embodiment controls the transform process to the chrominance signals according to an image signal format. The signal format is a scheme of chrominance subsampling of thinning the chrominance signals by sampling. The signal format is sometimes referred to as a chrominance format. In the present embodiment, three signal formats of 4:4:4, 4:2:2 and 4:2:0 are assumed.

Here, in the signal format 4:2:0, the resolution of the chrominance signals is vertically and horizontally half the size of the resolution of the luminance signals and not many high frequency components are included in the chrominance signals. In the signal format 4:4:4, the resolution of the chrominance signals is the same size as that of the luminance signals, and the information amount included in the chrominance signals becomes substantially large compared to 4:2:0. Also in 4:2:2, since the resolution in the vertical direction is equal for the chrominance signals and the luminance signals, the information amount included in the chrominance signals becomes large similarly to 4:4:4.

In the present embodiment, when the signal format of the image to which the target chrominance block belongs is 4:2:0, the transformer 121 applies DCT2 to the chrominance prediction residual for both of the horizontal direction and the vertical direction (that is, only the transform process of the default mode is applicable).

On the other hand, when the signal format of the image to which the target chrominance block belongs is 4:2:2, the transformer 121 applies DCT2 for the horizontal direction and one of DCT2, DST7 and DCT8 for the vertical direction. When the signal format of the image to which the target chrominance block belongs is 4:4:4, the transformer 121 applies one of DCT2, DST7 and DCT8 respectively for the horizontal direction and the vertical direction.

In the present embodiment, the transformer 121 includes a transform candidate specifier 121a and a transform type determiner 121b.

The transform candidate specifier 121a specifies transform type candidates applicable to the transform process according to the signal format for each target chrominance block. Specifically, the transform candidate specifier 121a specifies horizontal transform type candidates which are transform type candidates applicable to the transform process of the chrominance prediction residual in the horizontal direction and vertical transform type candidates which are transform type candidates applicable to the transform process of the chrominance prediction residual in the vertical direction according to the signal format.

FIG. 3 is a diagram illustrating the transform process to the chrominance signals relating to the present embodiment.

As illustrated in FIG. 3, the transform candidate specifier 121a specifies DCT2 as the horizontal transform type candidate and the vertical transform type candidate when the signal format is 4:2:0.

When the signal format is 4:2:2, the transform candidate specifier 121a specifies DCT2 as the horizontal transform type candidate and specifies DCT2, DST7 and DCT8 as the vertical transform type candidates.

When the signal format is 4:4:4, the transform candidate specifier 121a specifies DCT2, DST7 and DCT8 as the horizontal transform type candidates and the vertical transform type candidates. However, when the signal format is 4:4:4, the transform candidate specifier 121a may specify all the applicable transform type combinations (horizontal 3 kinds×vertical 3 kinds=9 ways) as the transform type candidates or may specify some predefined combinations as the transform type candidates. For example, selectable transform combinations (horizontal×vertical) may be (DCT2× DCT2), (DST7×DST7), (DST7×DCT8), (DCT8×DST7) and (DCT8×DCT8).

The transform type determiner 121b determines, for each target chrominance block, the transform type to be applied to the transform process in the horizontal direction (hereinafter, referred to as "horizontal transform type") from the horizontal transform type candidates and determines, for each target chrominance block, the transform type to be applied to the transform process in the vertical direction (hereinafter, referred to as "vertical transform type") from the vertical transform type candidates.

For example, the transform type determiner 121b tries the transform process by the horizontal transform type candidates and the vertical transform type candidates, and determines the combination of the horizontal transform type and the vertical transform type with which encoding efficiency becomes highest. Then, the transformer 121 generates the chrominance transform coefficients by applying the determined combination of the horizontal transform type and the vertical transform type to the chrominance prediction residual, and outputs the chrominance transform coefficients to the quantizer 122.

The entropy encoder 130 performs transmission to the decoding side by performing an entropy encoding process to the flag information indicating the horizontal transform type and the vertical transform type determined by the transform type determiner 121b. Here, the entropy encoder 130 transmits the flag information indicating the horizontal transform type and the vertical transform type for each target chrominance block.

As illustrated in FIG. 3, when the signal format is 4:2:0, since the selectable horizontal and vertical transform process type is only one kind, the entropy encoder 130 does not need to transmit the flag information indicating the transform process to be applied. On the other hand, when the signal format is 4:2:2 or 4:2:4, the flag information indicating the applied transform combination is entropy-encoded.

Note that the entropy encoder 130 performs the transmission to the decoding side by performing the entropy encoding process to the flag information indicating the signal format of the source image.

Next, an operation flow regarding the transform process in the encoding device 1 relating to the present embodiment will be described. FIG. 4 is a diagram illustrating the operation flow regarding the transform process to one target chrominance block.

As illustrated in FIG. 4, in step S11, the transform candidate specifier 121a specifies the transform type candidates (specifically, the horizontal transform type candidates and the vertical transform type candidates) applicable to the transform process according to the signal format. Here, the transform candidate specifier 121a may acquire information indicating the signal format from the block divider 100 or may acquire the information from a preprocessor omitted in illustrations.

In step S12, the transform type determiner 121b determines the horizontal transform type from the horizontal transform type candidates specified by the transform candidate specifier 121a and determines the vertical transform type from the vertical transform type candidates specified by the transform candidate specifier 121a.

In step S13, the transformer 121 generates the chrominance transform coefficients by applying the combination of the horizontal transform type and the vertical transform type determined by the transform type determiner 121b to the chrominance prediction residual outputted by the residual generator 110 and outputs the chrominance transform coefficients to the quantizer 122.

In step S14, the entropy encoder 130 performs stream output (the transmission to the decoding side) by performing the entropy encoding process to the flag information indicating the combination of the horizontal transform type and the vertical transform type determined by the transform type determiner 121b. In addition, the entropy encoder 130 performs the stream output by performing the entropy encoding process to the chrominance quantized transform coefficients outputted by the quantizer 122.

In such a manner, according to the encoding device 1 relating to the present embodiment, the encoding efficiency of the chrominance signals can be improved by controlling the transform type to be applied to the transform process of the chrominance prediction residual according to the signal format of the image.

<Decoding Device>

Figure 5:
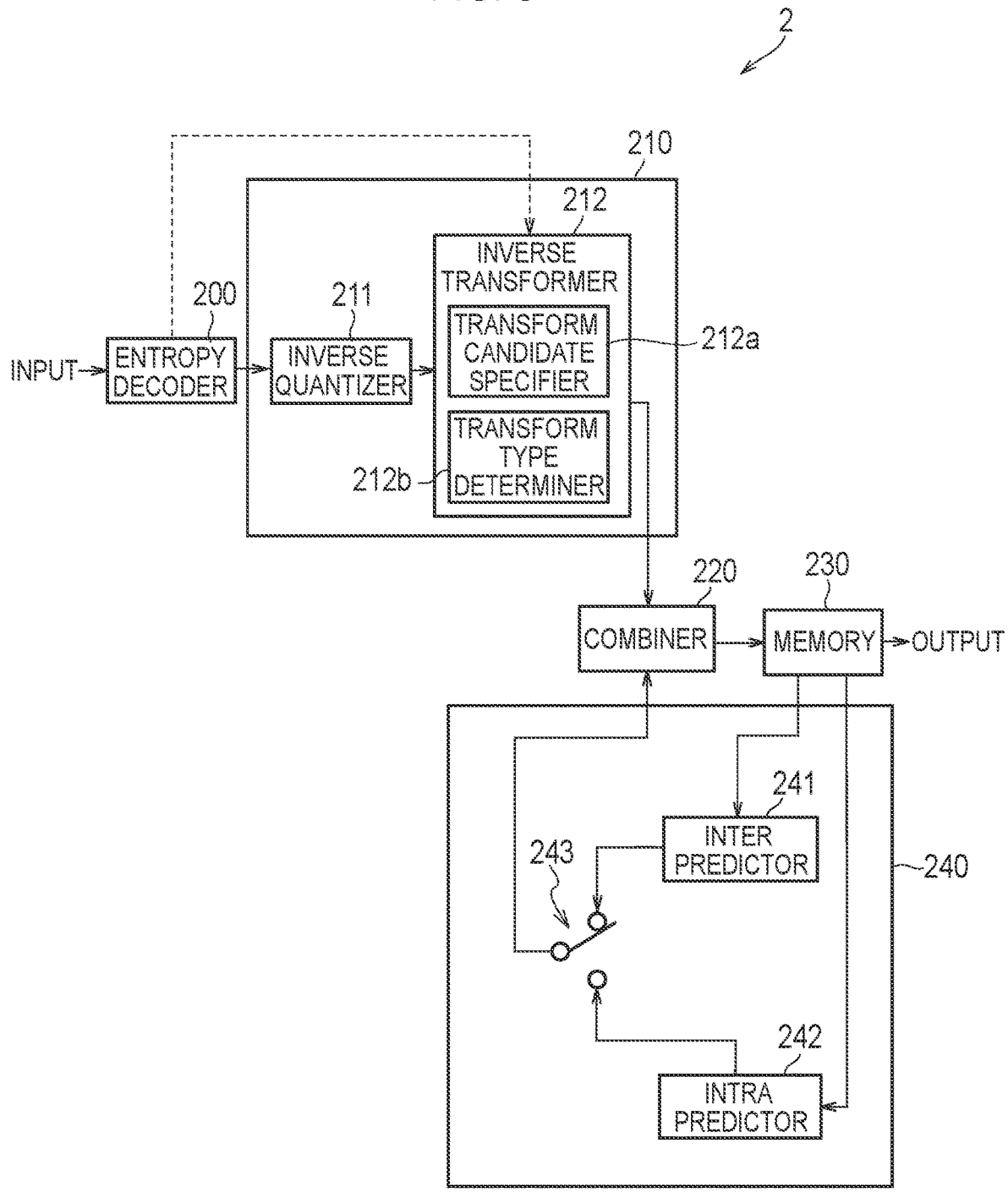
FIG. 5 is a diagram illustrating a configuration of a decoding device relating to the embodiment.

Next, the configuration of the decoding device relating to the present embodiment will be described focusing mainly on differences from the encoding device 1. FIG. 5 is a diagram illustrating the configuration of a decoding device 2 relating to the present embodiment.

As illustrated in FIG. 5, the decoding device 2 includes an entropy decoder 200, an inverse quantizer/inverse transformer 210, a combiner 220, a memory 230, and a predictor 240.

The entropy decoder 200 decodes the encoded data and outputs the quantized transform coefficients corresponding to a decoding target block to the inverse quantizer/inverse transformer 210. In addition, the entropy decoder 200 acquires the information regarding the transform process and outputs the information regarding the transform process to the inverse quantizer/inverse transformer 210 (inverse transformer 212). The information regarding the transform process includes the flag information indicating the combination of the horizontal transform type and the vertical transform type described above. Further, the entropy decoder 200 acquires the information regarding the prediction process and outputs the information regarding the prediction process to the predictor 240.

The inverse quantizer/inverse transformer 210 executes an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse quantizes the quantized transform coefficients outputted from the entropy decoder 200 by using the quantization parameter (Qp) and the quantization matrix to restore transform coefficients in the decoding target block, and outputs the restored transform coefficients to the inverse transformer 212.

The inverse transformer 212 performs the inverse transform process corresponding to the transform process performed by the transformer 121 of the encoding device 1. The inverse transformer 212 restores the prediction residual by performing the inverse transform process on the transform coefficients outputted from the inverse quantizer 211, and outputs the restored prediction residual (restoration prediction residual) to the combiner 220.

The combiner 220 decodes (reconstructs) an original block by combining the prediction residual outputted by the inverse transformer 212 and a prediction block outputted by the predictor 240 in pixel units, and outputs the decoded block to the memory 230.

The memory 230 stores the decoded block outputted by the combiner 220 and accumulates the decoded block as decoded images in frame units. The memory 230 outputs the decoded block or the decoded images to the predictor 240. In addition, the memory 230 outputs the decoded images in frame units to the outside of the decoding device 2. Note that a loop filter may be interposed between the combiner 220 and the memory 230.

The predictor 240 performs the prediction in units of blocks. The predictor 240 includes an inter predictor 241, an intra predictor 242 and a switcher 243.

The inter predictor 241 performs the inter prediction utilizing the inter-frame correlation. Specifically, the inter predictor 241 generates the inter prediction block by predicting the encoding target block by using the decoded image stored in the memory 230 as the reference image based on the information regarding the inter prediction (for example, motion vector information) outputted from the entropy decoder 200, and outputs the generated inter prediction block to the switcher 243.

The intra predictor 242 performs the intra prediction utilizing the intra-frame spatial correlation. Specifically, the intra predictor 242 generates the intra prediction block by referring to the decoded pixels present around the encoding target block of the decoded image stored in the memory 230 using the intra prediction mode according to the information regarding the intra prediction (for example, intra prediction mode information) outputted from the entropy decoder 200, and outputs the generated intra prediction block to the switcher 243.

The switcher 243 switches the prediction block between the inter prediction block outputted from the inter predictor 241 and the intra prediction block outputted from the intra predictor 242 and outputs one of the prediction blocks to the combiner 220.

The decoding device 2 configured in this way decodes the luminance block (target luminance block) as the decoding target block and the chrominance block (target chrominance block) as the decoding target block respectively. In the description of the decoding device 2 below, the decoding process of the target chrominance block will be mainly described.

The decoding device 2 relating to the present embodiment performs the decoding process in units of blocks into which the images constituted by the luminance signals and the chrominance signals are divided. The decoding device 2 includes the predictor 240 that predicts the target chrominance block and generates the prediction chrominance block, and the inverse transformer 212 that applies the inverse transform process to the chrominance transform coefficients from the encoding side and generates the chrominance prediction residual representing the difference between the target chrominance block and the prediction chrominance block.

Next, the inverse transformer 212 relating to the present embodiment will be described. In the present embodiment, the inverse transformer 212 can apply the MTS of switching the transform type for each decoding target block not only to the luminance block but also to the chrominance block.

First, the inverse transform process to the luminance signals will be described. In decoding of the luminance block, when the entropy decoder 200 acquires the flag information indicating that the transform type is the default mode, the inverse transformer 212 applies DCT2 to luminance transform coefficients for the horizontal direction and the vertical direction. On the other hand, when the entropy decoder 200 acquires the flag information indicating which of the total of 4 types of modes that are the combinations of DCT8 and DST7 is selected together with flag information indicating that the transform type is not the default mode, the inverse transformer 212 applies either one of DCT8 and DST7 to the luminance transform coefficients respectively for the horizontal direction and the vertical direction.

Secondly, the inverse transform process to the chrominance signals will be described. The inverse transformer 212 relating to the present embodiment controls the inverse transform process to the chrominance signals according to the signal format of the image. Here, the entropy decoder 200 acquires the information indicating the signal format and the signal format is notified from the entropy decoder 200 to the inverse transformer 212.

In the present embodiment, when the signal format of the image to which the target chrominance belongs is 4:2:0, the inverse transformer 212 applies DCT2 to the chrominance transform coefficients for both of the horizontal direction and the vertical direction (that is, only the inverse transform process of the default mode is applicable).

On the other hand, when the signal format of the image to which the target chrominance block belongs is 4:2:2, based on the flag information indicating the combination of the horizontal transform type and the vertical transform type, the inverse transformer 212 applies DCT2 for the horizontal direction and one of DCT2, DST7 and DCT8 for the vertical direction. When the signal format of the image to which the target chrominance block belongs is 4:4:4, based on the flag information indicating the combination of the horizontal transform type and the vertical transform type, the inverse transformer 212 applies one of DCT2, DST7 and DCT8 respectively for the horizontal direction and the vertical direction.

In the present embodiment, the inverse transformer 212 includes a transform candidate specifier 212a and a transform type determiner 212b.

The transform candidate specifier 212a specifies transform type candidates applicable to the inverse transform process according to the signal format for each target chrominance block. Specifically, the transform candidate specifier 212a specifies horizontal transform type candidates which are transform type candidates applicable to the inverse transform process of the chrominance transform coefficients in the horizontal direction and vertical transform type candidates which are transform type candidates applicable to the inverse transform process of the chrominance transform coefficients in the vertical direction according to the signal format. A specifying method of the horizontal transform type candidates and the vertical transform type candidates is similar to the specifying method (see FIG. 3) in the encoding device 1.

The transform type determiner 212b determines the horizontal transform type to be applied to the inverse transform process in the horizontal direction from the horizontal transform type candidates for each target chrominance block and determines the vertical transform type to be applied to the inverse transform process in the vertical direction from the vertical transform type candidates for each target chrominance block, based on the flag information indicating the combination of the horizontal transform type and the vertical transform type.

Next, an operation flow regarding the inverse transform process in the decoding device 2 relating to the present embodiment will be described. FIG. 6 is a diagram illustrating the operation flow regarding the inverse transform process to one target chrominance block.

As illustrated in FIG. 6, in step S21, the transform candidate specifier 212a specifies the transform type candidates (specifically, the horizontal transform type candidates and the vertical transform type candidates) applicable to the inverse transform process according to the signal format.

In step S22, based on the flag information indicating the combination of the horizontal transform type and the vertical transform type, the transform type determiner 212b determines the horizontal transform type from the horizontal transform type candidates specified by the transform candidate specifier 212a and determines the vertical transform type from the vertical transform type candidates specified by the transform candidate specifier 121a. However, when the signal format is 4:2:0, the transform type determiner 212b may apply DCT2 (default mode) to the chrominance transform coefficients for both of the horizontal direction and the vertical direction without being based on the flag information.

In step S23, the inverse transformer 212 generates the chrominance prediction residual by applying the combination of the horizontal transform type and the vertical transform type determined by the transform type determiner 212b to the chrominance transform coefficients outputted by the inverse quantizer 211 and outputs the chrominance prediction residual to the combiner 220.

In such a manner, according to the decoding device 2 relating to the present embodiment, the encoding efficiency of the chrominance signals can be improved by controlling the transform type to be applied to the inverse transform process of the chrominance transform coefficients according to the signal format of the image.

<Modification 1>

In the embodiment described above, a transform skip may be included in the horizontal transform type candidates and the vertical transform type candidates. For example, the transform candidate specifiers 121a and 212a may apply (DCT2×DCT2), (transform skip×transform skip), (DST7×DST7), (DST7×DCT8), (DCT8×DST7) and (DCT8×DCT8) as the combinations (horizontal×vertical) of the horizontal transform type candidates and the vertical transform type candidates.

<Modification 2>

In the embodiment described above, the horizontal transform type and the vertical transform type may be determined by utilizing the correlation between the luminance block and the chrominance block.

In this case, the transform type determiner 121b of the encoding device 1 determines the transform type to be applied to the transform process of the chrominance prediction residual from the transform type candidates specified by the transform candidate specifier 121a, based on the transform type applied to the transform of the prediction residual of the luminance block corresponding to the position of the target chrominance block (hereinafter, referred to as a reference luminance block).

On the other hand, the transform type determiner 212b of the decoding device 2 determines the transform type to be applied to the inverse transform process of the chrominance transform coefficients of the chrominance signals from the transform type candidates specified by the transform candidate specifier 212a, based further on the transform type applied to the inverse transform process of the transform coefficients of the reference luminance block.

For example, when the signal format is 4:4:4, the correlation between the luminance block and the chrominance block is high. Therefore, when the signal format is 4:4:4, the transform type determiner 121b (and 212b) may determine the horizontal direction transform type and the vertical direction transform type applied to the transform process (or the inverse transform process) of the reference luminance block as the horizontal direction transform type and the vertical direction transform type to be applied to the transform process (or the inverse transform process). However, when the combination of the horizontal direction transform type candidate and the vertical direction transform type candidate does not match with the combination of the horizontal direction transform type and the vertical direction transform type applied to the transform process (or the inverse transform process) of the reference luminance block, the transform type determiner 121b (and 212b) may determine a predetermined combination of the horizontal direction transform type and the vertical direction transform type. When the signal format is 4:4:4, the transmission of the flag information indicating the combination of the horizontal direction transform type and the vertical direction transform type may not be required. In addition, only a copy flag indicating whether or not to apply the combination of the horizontal direction transform type and the vertical direction transform type applied to the transform process of the reference luminance block to the transform process of the target chrominance block may be transmitted and the transmission of the flag information indicating the combination may not be required. In such a case, when the copy flag is 1, as described above, the horizontal direction transform type and the vertical direction transform type applied to the transform process of the reference luminance block are determined as the horizontal direction transform type and the vertical direction transform type to be applied to the transform process. However, when the combination of the horizontal direction transform type candidate and the vertical direction transform type candidate does not match with the combination of the horizontal direction transform type and the vertical direction transform type applied to the transform process (or the inverse transform process) of the reference luminance block, the transform type determiner 121b (and 212b) may determine a predetermined combination of the horizontal direction transform type and the vertical direction transform type. On the other hand, when the copy flag is 0, DCT2 (default mode) may be applied to the transform coefficients of the target chrominance block for both of the horizontal direction and the vertical direction.

When the signal format is 4:2:2, the correlation between the luminance block and the chrominance block in the vertical direction is high. Therefore, when the signal format is 4:2:2, the transform type determiner 121b (and 212b) may determine the vertical direction transform type applied to the transform process (or the inverse transform process) of the reference luminance block as the vertical direction transform type to be applied to the transform process (or the inverse transform process). However, when the vertical direction transform type candidate does not match with the vertical direction transform type applied to the transform process (or the inverse transform process) of the reference luminance block, the transform type determiner 121b (and 212b) may determine a predetermined vertical direction transform type. When the signal format is 4:2:2, the transmission of the flag information indicating the vertical direction transform type may not be required. In addition, only the copy flag indicating whether or not to apply the vertical direction transform type applied to the transform process of the reference luminance block to the transform process of the target chrominance block may be transmitted and the transmission of the flag information indicating the vertical direction transform type may not be required. In such a case, when the copy flag is 1, as described above, the vertical direction transform type applied to the transform process of the reference luminance block is determined as the vertical direction transform type to be applied to the transform process. However, the vertical direction transform type candidate does not match with the vertical direction transform type applied to the transform process (or the inverse transform process) of the reference luminance block, the transform type determiner 121b (and 212b) may determine a predetermined vertical direction transform type. On the other hand, when the copy flag is 0, DCT2 (default mode) may be applied to the transform coefficients of the target chrominance block for the vertical direction.

A program may be provided to cause a computer to execute the operations of the encoding device 1. A program may be provided to cause a computer to execute the operations of the decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM or a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. An encoding device that performs an encoding process in units of blocks into which images constituted by luminance signals and chrominance signals are divided, the encoding device comprising:
   a predictor configured to predict a target chrominance block which is an encoding target block of the chrominance signals and generate a prediction chrominance block;
   a residual generator configured to generate a chrominance prediction residual indicating a difference between the target chrominance block and the prediction chrominance block; and
   a transformer configured to apply a transform process to the chrominance prediction residual and generate transform coefficients, wherein
   the transformer includes:
      a transform candidate specifier configured to specify, according to a signal format, transform type candidates applicable to the transform process; and
      a transform type determiner configured to:
         determine a transform type applied to the transform process of a reference luminance block, that is a luminance block corresponding to a position of the target chrominance block, as the transform type to be applied to the transform process when the transform type candidates include the transform type applied to the transform process of the reference luminance block; and
         determine a predetermined transform type as the transform type to be applied to the transform process when the transform type candidates do not include the transform type applied to the transform process of the reference luminance block.

2. The encoding device according to claim 1, wherein the transformer is configured to determine a predetermined combination of a horizontal direction transform type and a vertical direction transform type as the horizontal direction transform type and the vertical direction transform type to be applied to the transform process respectively when combinations of the horizontal direction transform type candidate and the vertical direction transform type candidate do not include a combination of the horizontal direction transform type and the vertical direction transform type applied to the transform process of the reference luminance block.

3. The encoding device according to claim 1, further comprising an entropy encoder, wherein
   the transform candidate specifier is configured to specify, according to the signal format of the images, horizontal transform type candidates which are transform type candidates applicable to the transform process in a horizontal direction and vertical transform type candidates which are transform type candidates applicable to the transform process in a vertical direction,
   the transform type determiner is configured to determine a horizontal transform type to be applied to the transform process in the horizontal direction from the horizontal transform type candidates and determine a vertical transform type to be applied to the transform process in the vertical direction from the vertical transform type candidates, and the entropy encoder is configured to transmit flag information, to a decoding side, indicating the horizontal transform type and the vertical transform type determined by the transform type determiner.

4. The encoding device according to claim 1, further comprising an entropy encoder-configured to transmit a copy flag indicating whether or not to apply the transform type applied to the transform process of the reference luminance block to the transform process of the target chrominance block.

5. A non-transitory computer-readable medium storing a program causing a computer to function as the encoding device according to claim 1.

6. A decoding device that performs a decoding process in units of blocks into which images constituted by luminance signals and chrominance signals are divided, the decoding device comprising:
- a predictor configured to predict a target chrominance block which is a decoding target block of the chrominance signals and generate a prediction chrominance block; and
- an inverse transformer configured to apply an inverse transform process to transform coefficients from an encoding side and generate a chrominance prediction residual indicating a difference between the target chrominance block and the prediction chrominance block, wherein the inverse transformer includes:
- a transform candidate specifier configured to specify, according to a signal format, transform type candidates applicable to the inverse transform process; and
- a transform type determiner configured to:
  - determine a transform type applied to the inverse transform process of a reference luminance block, that is a luminance block corresponding to a position of the target chrominance block, as the transform type to be applied to the inverse transform process when the transform type candidates include the transform type applied to the inverse transform process of the reference luminance block; and
  - determine a predetermined transform type as the transform type to be applied to the inverse transform process when the transform type candidates do not include the transform type applied to the inverse transform process of the reference luminance block.

7. The decoding device according to claim 6, wherein
the inverse transformer is configured to determine a predetermined combination of a horizontal direction transform type and a vertical direction transform type as the horizontal direction transform type and the vertical direction transform type to be applied to the inverse transform process respectively when combinations of the horizontal direction transform type candidate and the vertical direction transform type candidate do not include a combination of the horizontal direction transform type and the vertical direction transform type applied to the inverse transform process of the reference luminance block.

8. The decoding device according to claim 6, further comprising
an entropy decoder configured to acquire flag information indicating a horizontal transform type and a vertical transform type determined on the encoding side, wherein
the transform candidate specifier is configured to specify, according to the signal format of the images, horizontal transform type candidates applicable to the inverse transform process in a horizontal direction and vertical transform type candidates applicable to the inverse transform process in the vertical direction, and
the transform type determiner is configured to determine the transform type from the horizontal transform type candidates and determines the transform type from the vertical transform type candidates based on the flag information.

9. The decoding device according to claim 6, further comprising an entropy decoder configured to acquire a copy flag indicating whether or not to apply the transform type applied to the transform process of the reference luminance block to the transform process of the target chrominance block, wherein
the transform type determiner is configured to determine a default mode as the transform type to be applied to the inverse transform process of the transform coefficients of the target chrominance block when the copy flag indicates negative.

10. A non-transitory computer-readable medium storing a program causing a computer to function as the decoding device according to claim 6.

* * * * *